(12) United States Patent
Yamashita et al.

(10) Patent No.: US 8,679,412 B2
(45) Date of Patent: Mar. 25, 2014

(54) EXHAUST GAS-PURIFYING SYSTEM

(71) Applicants: Yoshinori Yamashita, Kakegawa (JP);
Daisuke Oki, Kakegawa (JP); Mai Huong Tran, Kakegawa (JP); Takuya Sato, Kakegawa (JP)

(72) Inventors: Yoshinori Yamashita, Kakegawa (JP);
Daisuke Oki, Kakegawa (JP); Mai Huong Tran, Kakegawa (JP); Takuya Sato, Kakegawa (JP)

(73) Assignee: Cataler Corporation, Shizuoka (JP)

( * ) Notice: Subject to any disclaimer, the term of this patent is extended or adjusted under 35 U.S.C. 154(b) by 0 days.

(21) Appl. No.: 13/626,524

(22) Filed: Sep. 25, 2012

(65) Prior Publication Data
US 2013/0078160 A1    Mar. 28, 2013

Related U.S. Application Data

(63) Continuation of application No. PCT/JP2011/057375, filed on Mar. 25, 2011.

(30) Foreign Application Priority Data

Mar. 26, 2010    (JP) ................................. 2010-073381

(51) Int. Cl.
*B01D 50/00* (2006.01)

(52) U.S. Cl.
USPC .......................................... 422/172; 422/169

(58) Field of Classification Search
USPC ............. 422/177, 182, 176; 60/295, 299, 297
See application file for complete search history.

(56) References Cited

U.S. PATENT DOCUMENTS

2007/0269353 A1*  11/2007  Li et al. .......................... 422/176
2009/0193794 A1*  8/2009  Robel et al. ...................... 60/295

FOREIGN PATENT DOCUMENTS

| JP | 6-182219 |   | 7/1994 |
| JP | 9-173782 | A | 7/1997 |
| JP | 2002-89327 |   | 3/2002 |
| JP | 2004-60494 | A | 2/2004 |
| JP | 2006-183507 | A | 7/2006 |
| JP | 2008-296224 | A | 12/2008 |
| JP | 2009-191823 |   | 8/2009 |
| JP | 2009-291764 | A | 12/2009 |

OTHER PUBLICATIONS

International Search Report mailed by the International Searching Authority (ISA/JP) on Jun. 28, 2011 in connection with PCT International Application No. PCT/JP2011/057375, filed Mar. 25, 2011.
Written Opinion of the International Searching Authority mailed by the International Searching Authority (ISA/JP) on Jun. 28, 2011 in connection with PCT International Application No. PCT/JP2011/057375, filed Mar. 25, 2011.

(Continued)

*Primary Examiner* — Tom Duong
(74) *Attorney, Agent, or Firm* — John P. White; Cooper & Dunham LLP

(57) ABSTRACT

An exhaust gas-purifying system for purifying exhaust gas discharged from a diesel engine includes a diesel oxidation catalyst through which the exhaust gas passes, a diesel particulate filter which includes a filter substrate and an active component supported by the filter substrate and exhibiting a catalytic activity for selective catalytic reduction and through which the exhaust gas having passed through the diesel oxidation catalyst penetrates, and an ammonia slip catalyst which includes a zeolite whose alkaline metal ions are partially exchanged with transition metal ions and through which the exhaust gas having penetrated the diesel particulate filter passes.

12 Claims, 5 Drawing Sheets

(56) References Cited

OTHER PUBLICATIONS

Notification of Transmittal of Translation of the International Preliminary Report on Patentability (Chapter I or Chapter II), including International Preliminary Report on Patentability and Written Opinion of the International Searching Authority, mailed Nov. 1, 2012 by the International Bureau of WIPO in connection with PCT International Application No. PCT/JP2011/057375, filed Mar. 25, 2011.

Office Action issued Jul. 2, 2013 in connection with Japanese Patent Application No. 2012-507088, filed Jun. 8, 2011.

* cited by examiner

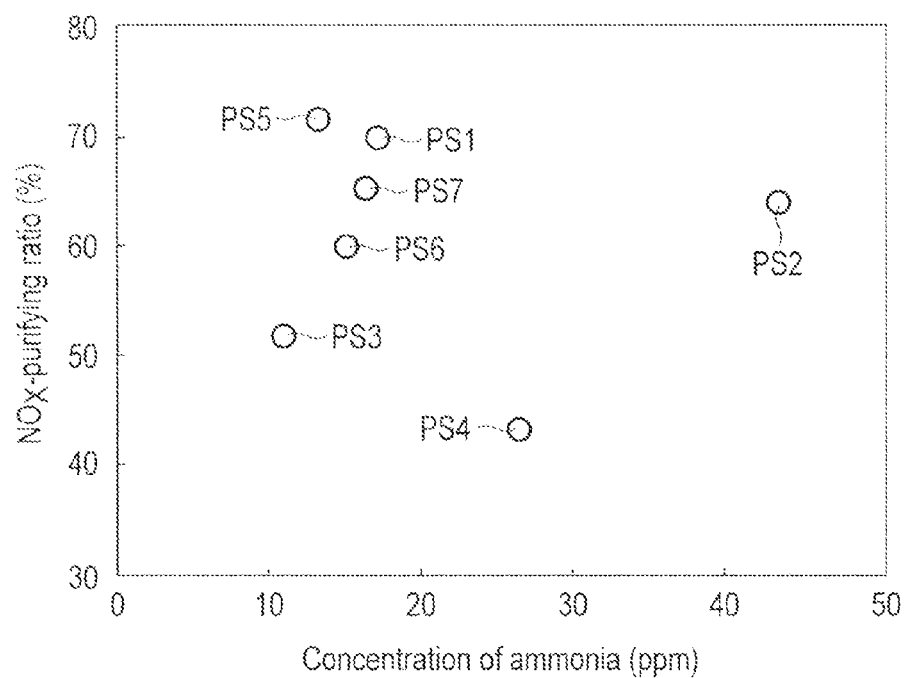
F I G. 7
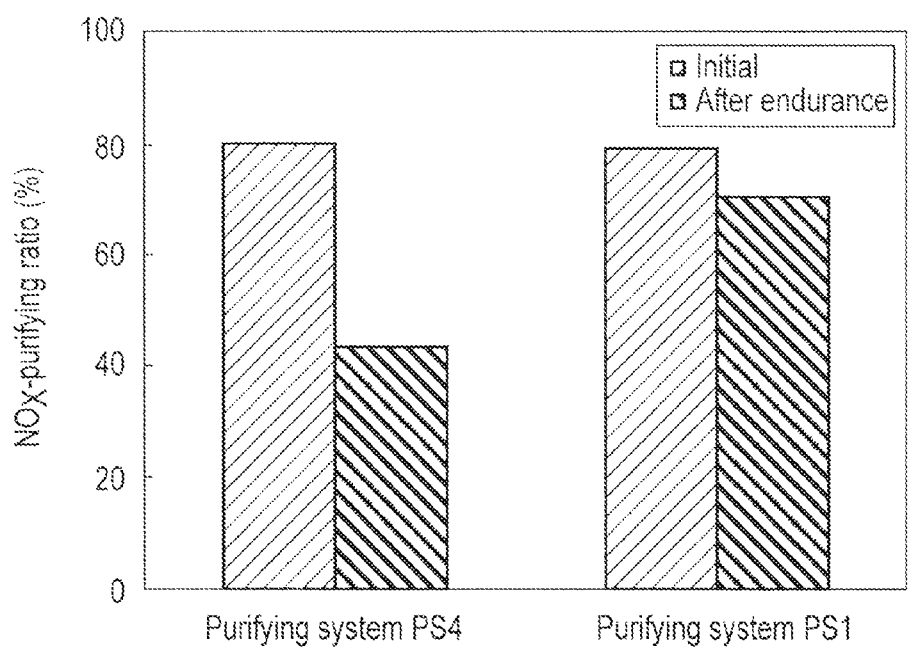
F I G. 8

EXHAUST GAS-PURIFYING SYSTEM

CROSS REFERENCE TO RELATED APPLICATIONS

This application is a Continuation Application of PCT Application No. PCT/JP2011/057375, filed Mar. 25, 2011 and based upon and claiming the benefit of priority from prior Japanese Patent Application No. 2010-073381, filed Mar. 26, 2010, the entire contents of all of which are incorporated herein by reference.

BACKGROUND OF THE INVENTION

1. Field of the Invention

The present invention relates to an exhaust gas-purifying system.

2. Description of the Related Art

In some cases, a diesel oxidation catalyst, a diesel particulate filter, a selective catalytic reduction catalyst, and an ammonia slip catalyst are arranged in this order from the upstream side toward the downstream side in an exhaust system for a diesel engine.

In such an exhaust gas-purifying system, the exhaust gas discharged from the diesel engine passes through the diesel oxidation catalyst. The diesel oxidation catalyst promotes oxidation of carbon monoxide (CO) and hydrocarbons (HC) in the exhaust gas. Thus, the concentrations of carbon monoxide and hydrocarbons in the exhaust gas are lowered, and the particulate matter (PM) made of high-boiling hydrocarbons and sulfides is partially removed therefrom.

Subsequently, the exhaust gas passes through the diesel particulate filter. The diesel particulate filter filtrates the exhaust gas with the porous walls thereof to remove the remainder of the particulate matter from the exhaust gas.

Into the exhaust gas having passed through the diesel particulate filter, ammonia ($NH_3$) or a precursor of ammonia such as aqueous urea ($CO(NH_2)_2$) is injected. As described in JP-A 2008-296224, the selective catalytic reduction catalyst promotes the reaction of nitrogen oxides ($NO_x$) with ammonia added to the exhaust gas or originated from the precursor of ammonia. By this reaction, the nitrogen oxides are reduced into nitrogen. As a result, the concentration of nitrogen oxides is lowered.

Then, the exhaust gas passes through the ammonia slip catalyst. The ammonia slip catalyst is an oxidation catalyst. The ammonia slip catalyst promotes oxidation of unreacted ammonia discharged from the selective catalytic reduction catalyst. Although oxidation of ammonia produces nitrogen oxides, an amount of nitrogen oxides produced in the ammonia slip catalyst is small because the amount of unreacted ammonia discharged from the selective catalytic reduction catalyst is small. That is, the ammonia slip catalyst lowers the concentration of ammonia in the exhaust gas without greatly increasing the concentration of nitrogen oxides in the exhaust gas.

BRIEF SUMMARY OF THE INVENTION

The above-described exhaust gas-purifying system offers an excellent purifying performance. However, this exhaust gas-purifying system requires a relatively large space for installation because it includes four catalysts.

Thus, an object of the present invention is to provide a technique that is advantageous in downsizing an exhaust gas-purifying system for purifying an exhaust gas discharged from a diesel engine.

According to an aspect of the invention, there is provided an exhaust gas-purifying system for purifying exhaust gas discharged from a diesel engine, comprising: a diesel oxidation catalyst through which the exhaust gas passes; a diesel particulate filter which includes a filter substrate and an active component supported by the filter substrate and exhibiting a catalytic activity for selective catalytic reduction and through which the exhaust gas having passed through the diesel oxidation catalyst penetrates; and an ammonia slip catalyst which includes a zeolite whose alkaline metal ions are partially exchanged with transition metal ions and through which the exhaust gas having penetrated the diesel particulate filter passes.

BRIEF DESCRIPTION OF THE SEVERAL VIEWS OF THE DRAWING

FIG. 7 is a graph showing an example of performance of exhaust gas-purifying systems regarding ammonia slip and $NO_x$-purification;

FIG. 8 is a graph showing an example of initial and post-endurance performance of exhaust gas-purifying systems regarding $NO_x$-purification.

DETAILED DESCRIPTION OF THE INVENTION

Figure 1:
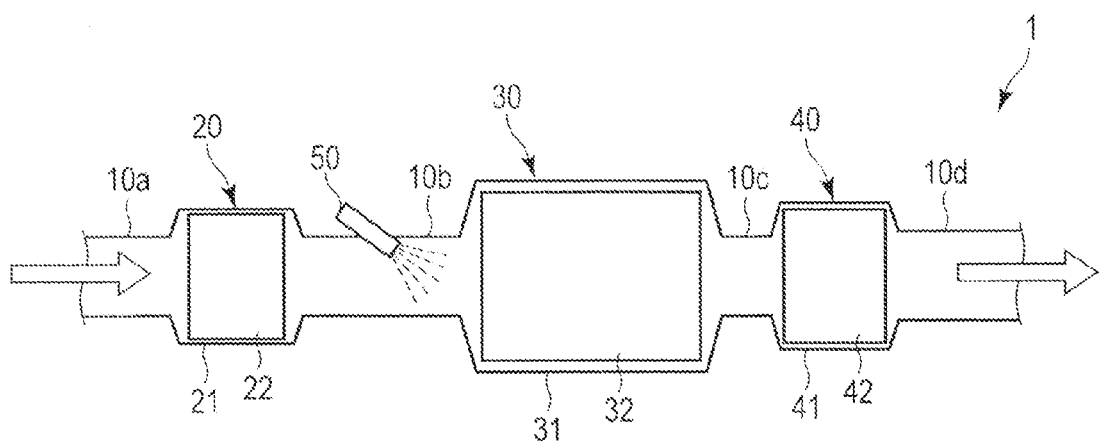
FIG. 1 is a view schematically showing an exhaust gas-purifying system according to an embodiment of the present invention.

An embodiment of the present invention will be described below with reference to the accompanying drawings. Note that the same reference symbols in the drawings indicate components that achieve the same or similar functions, and a repetitive explanation thereof will be omitted.

Figure 2:
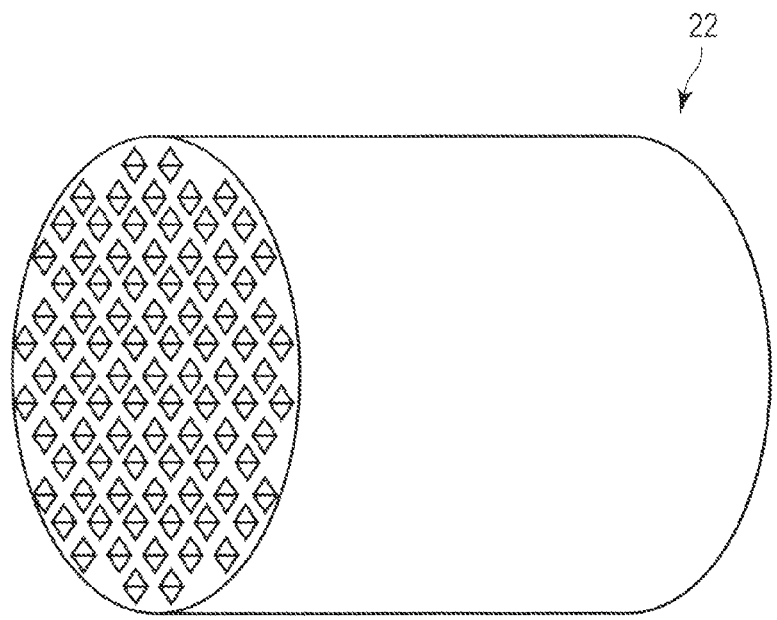
FIG. 2 is a perspective view showing an example of a diesel oxidation catalyst that can be used in the exhaust gas-purifying system shown in FIG. 1.
Figure 3:
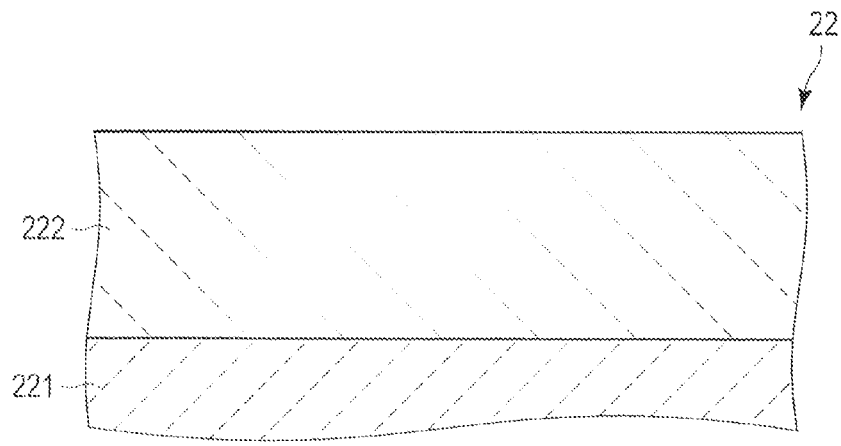
FIG. 3 is an enlarged sectional view showing a part of the diesel oxidation catalyst shown in FIG. 2.
Figure 4:
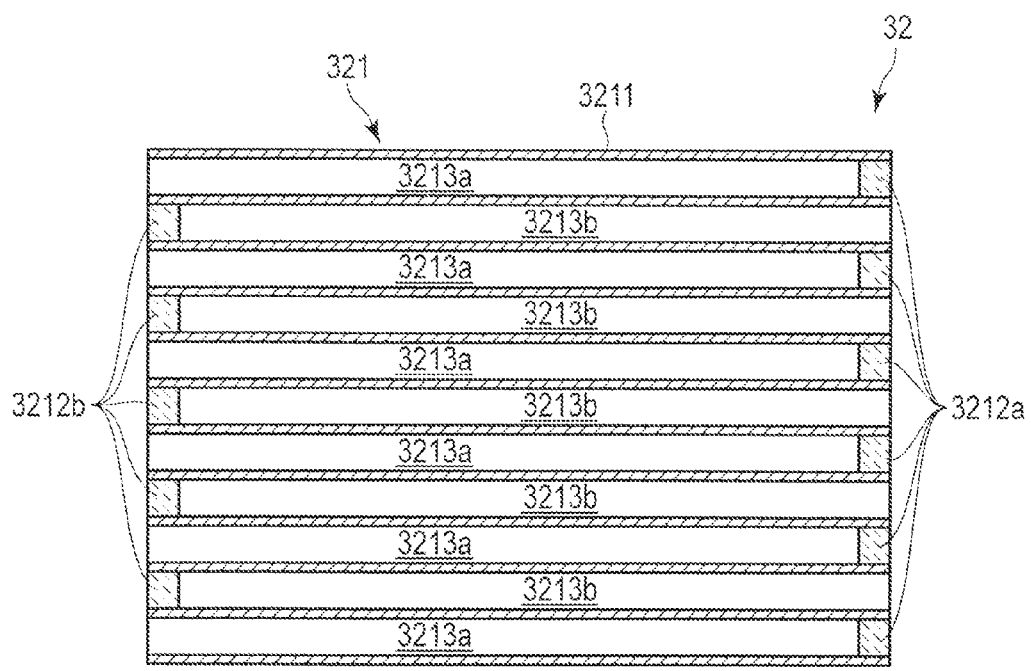
FIG. 4 is a sectional view showing an example of a diesel particulate filter that can be used in the exhaust gas-purifying system shown in FIG. 1.
Figure 5:
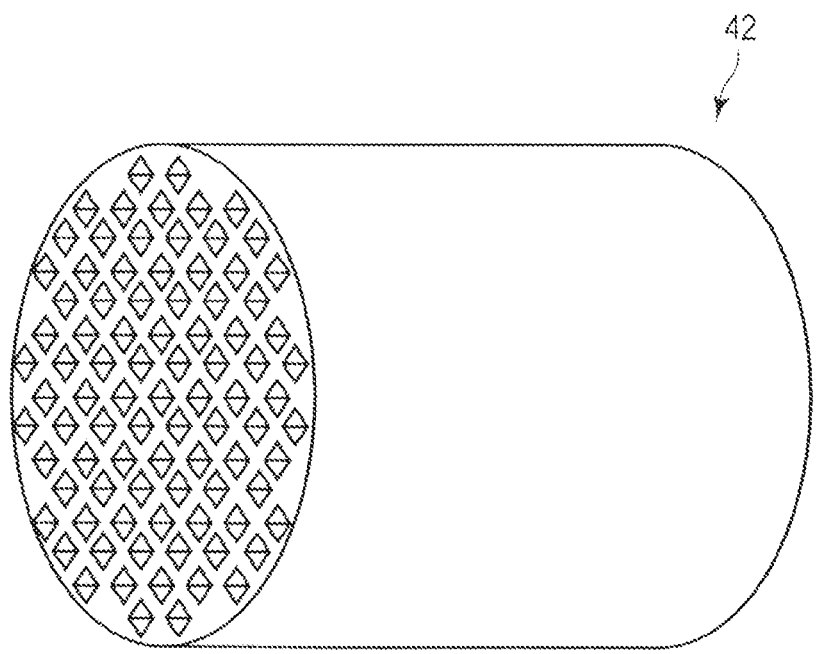
FIG. 5 is a sectional view showing an example of an ammonia slip catalyst that can be used in the exhaust gas-purifying system shown in FIG. 1.
Figure 6:
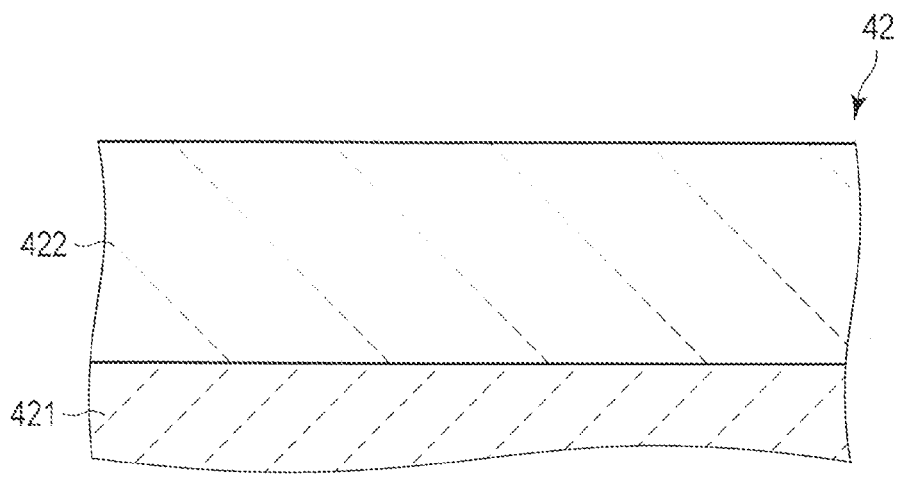
FIG. 6 is an enlarged sectional view showing a part of the ammonia slip catalyst shown in FIG. 5.

FIG. 1 is a view schematically showing an exhaust gas-purifying system according to an embodiment of the present invention. FIG. 2 is a perspective view showing an example of a diesel oxidation catalyst that can be used in the exhaust gas-purifying system shown in FIG. 1. FIG. 3 is an enlarged sectional view showing a part of the diesel oxidation catalyst shown in FIG. 2. FIG. 4 is a sectional view showing an example of a diesel particulate filter that can be used in the exhaust gas-purifying system shown in FIG. 1. FIG. 5 is a sectional view showing an example of an ammonia slip catalyst that can be used in the exhaust gas-purifying system shown in FIG. 1. FIG. 6 is an enlarged sectional view showing a part of the ammonia slip catalyst shown in FIG. 5. Note that the arrow outline with a blank inside indicates a flow direction of exhaust gas.

The exhaust gas-purifying system 1 shown in FIG. 1 is an exhaust gas-purifying system that purifies exhaust gas discharged from a diesel engine (not shown). The exhaust gas-purifying system 1 includes catalytic converters 20, 30 and 40 connected in series between the diesel engine and a tail pipe (not shown).

As shown in FIG. 1, the catalytic converter 20 includes a converter body 21 and a diesel oxidation catalyst 22.

The converter body 21 is made of, for example, metal or alloy. The converter body 21 has a hollow structure provided with inlet and outlet ports. The inlet port of the converter body 21 is connected to piston chambers of the diesel engine via a pipe 10a and an exhaust manifold (not shown). The outlet port of the converter body 21 is connected to an end of a pipe 10b.

As shown in FIG. 2, the diesel oxidation catalyst 22 is a monolith catalyst of straight flow type. The diesel oxidation catalyst 22 is contained in the converter body 21 such that the exhaust gas supplied from the pipe 10a to the catalytic converter 20 passes through the through-holes of the diesel oxidation catalyst 22 and then discharged into the pipe 10b. The diesel oxidation catalyst 22 promotes oxidation of carbon monoxide and hydrocarbons. Thus, CO and HC concentrations of the exhaust gas are lowered, and the particulate matter made of high-boiling hydrocarbons or sulfides is partially removed from the exhaust gas.

As shown in FIG. 3, the diesel oxidation catalyst 22 includes a monolith honeycomb substrate 221 and a catalytic layer 222.

The monolith honeycomb substrate 221 is a column provided with through-holes each extending from one of the bases to the other of the bases. The monolith honeycomb substrate 221 is made of, for example, ceramics such as cordierite and silicon carbide.

The catalytic layer 222 is formed on the partition walls of the monolith honeycomb substrate 221. The catalytic layer 222 may have a single-layer structure or a multi-layer structure.

The catalytic layer 222 includes, for example, a first precious metal element and a first carrier.

The first precious metal element is, for example, an element of platinum group such as platinum and palladium. The catalytic layer 222 may includes only a single precious metal element or a plurality of precious metal elements as the first precious metal element.

The first carrier carries the first precious metal element. The first carrier is particles made of a refractory material such as alumina. The first carrier increases the surface area of the precious metal and dissipates the heat generated by the catalytic reaction so as to suppress sintering of the precious metal.

As shown in FIG. 1, the catalytic converter 30 includes a converter body 31 and a diesel particulate filter 32.

The converter body 31 is made of, for example, metal or alloy. The converter body 31 has a hollow structure provided with inlet and outlet ports. The inlet port of the converter body 31 is connected to the outlet port of the converter body 21 via the pipe 10b. The outlet port of the converter body 31 is connected to an end of a pipe 10c. The pipe 10b is provided with an injector 50 for injecting ammonia or a precursor thereof, for example, aqueous urea into the exhaust gas flowing in the pipe 10b.

The diesel particulate filter 32 is a monolith catalyst of wall flow type. The diesel particulate filter 32 is contained in the converter body 31 such that the exhaust gas supplied from the pipe 10b to the catalytic converter 30 passes through the partition walls of the diesel particulate filter 32 and then discharged into the pipe 10c. The diesel particulate filter 32 removes the remainder of the particulate matter from the exhaust gas.

As shown in FIG. 4, the diesel particulate filter 32 includes a monolith honeycomb substrate 321 and an active component (not shown).

The monolith honeycomb substrate 321 includes a honeycomb structure 3211 and plugs 3212a and 3212b.

The honeycomb structure 3211 is a column provided with through-holes each extending from one of the bases to the other of the bases. The honeycomb structure includes porous partition walls. The porous partition walls allow the exhaust gas to pass through without allowing almost the whole particulate matter carried by the exhaust gas to pass therethrough.

As a material of the honeycomb structure 3211, for example, ceramics such as cordierite and silicon carbide can be used. A nonwoven fabric made of metal may be incorporated in the honeycomb structure 3211.

The plugs 3212a plug some of the holes of the honeycomb structure 3211 at the downstream side. The plugs 3212b plug the remainder of the holes of the honeycomb structure 3211 at the upstream side. The term "upstream side" used herein means the end surface of the honeycomb structure to which the exhaust gas is supplied. On the other hand, the term "downstream side" used herein means the end surface of the honeycomb structure from which the exhaust gas is discharged.

The plugs 3212a and 3212b are arranged such that the hole plugged with the plug 3212a and the hole plugged with the plug 3212b are adjacent to each other with the porous partition wall interposed therebetween and the plugs 3212b are positioned on the upstream side with respect to the plugs 3212a. Although the plugs 3212a are arranged on the downstream side of the honeycomb structure 3211, the plugs 3212a may be arranged at positions spaced apart from the downstream side of the honeycomb structure 3211. Similarly, although the plugs 3212b are arranged on the upstream side of the honeycomb structure 3211, the plugs 3212b may be arranged at positions spaced apart from the upstream side of the honeycomb structure 3211.

As materials of the plugs 3212a and 3212b, for example, ceramics such as cordierite and silicon carbide can be used.

The plugs 3212a and the porous partition walls form upstream cells 3213a that open on the upstream side. The plugs 3212b and the porous partition walls form downstream cells 3213b that open on the downstream side. The upstream cell 3213a and the downstream cell 3213b are adjacent to each other with the porous partition wall interposed therebetween.

The active component is supported by the filter substrate 321, in particular, the honeycomb structure 32211. The active component is a component that exhibits a catalytic activity for the selective catalytic reduction, in other words, a component that promotes the reaction between nitrogen oxides and ammonia. Note that the following formula (1) represents the reaction between water and urea that can be used as the ammonia precursor. Note also that the following formulae (2) and (3) represent examples of reaction between nitrogen oxides and ammonia.

$$(NH_2)_2CO + H_2O \rightarrow 2NH_3 + CO_2 \tag{1}$$

$$4NH_3 + 4NO + O_2 \rightarrow 4N_2 + 6H_2O \tag{2}$$

$$4NH_3 + 2NO_2 + O_2 \rightarrow 3N_2 + 6H_2O \tag{3}$$

As the active component, active components that are generally used in the selective catalytic reduction may be used. For example, zeolite whose metal ions, in particular, alkali metal ions such as sodium ions and potassium ions are partially exchanged with transition metal ions such as iron ions and copper ions may be used as the active component. Alternatively, titanium, tungsten, vanadium, zirconium or cerium may be used as the active component. Note that the zeolite-based active component has a high ability in adsorbing ammonia. Thus, in the case of using the zeolite-based active component, the ammonia slip can be effectively suppressed by monitoring the adsorption amount and temperature and appropriately controlling desorption of ammonia.

In some cases, fuel is discontinuously or continuously sprayed onto the diesel particulate filter 32 to burn off the particulate matter deposited on the filter. Thus, there is a possibility that the active component is subjected to high temperatures.

In the case of using a zeolite whose alkali metal ions are partially exchanged with transition metal ions as the active component, a proportion of the alkali metal ions exchanged with the transition metal ions should be increased in order to achieve a high catalytic activity. However, when the proportion is increased, the heat resistance of the zeolite degrades. Thus, in the case f using such a zeolite as the active component, there is a possibility that the abilities of selective catalytic reduction and ammonia adsorption are greatly lowered when subjected to high temperatures.

When the ability of the diesel particulate filter 32 to promote the selective catalytic reduction is greatly lowered, a proportion of ammonia that reacts with nitrogen oxides is decreased. As a result, $NO_x$-purifying ability of the diesel particulate filter 32 is also lowered.

When the ability of the diesel particulate filter 32 to adsorb ammonia is greatly lowered, the ammonia slip is increased. Thus, the ammonia slip catalyst 42 to be described in detail needs a higher ability in purifying ammonia.

Although an ability of a composite oxide containing zirconia to adsorb ammonia is lower than that of zeolite, it has a higher heat resistance. In particular, a composite oxide containing at least one element selected from the group consisting of aluminum, silicon, titanium, cerium and tungsten in addition to zirconium exhibits a high heat resistance and a high catalytic activity for the selective catalytic reduction. For example, a composite oxide containing zirconium and cerium, in particular, a composite oxide containing zirconium, cerium, tungsten and optionally at least one element selected from the group consisting of silicon, titanium, neodymium and yttrium exhibits a high heat resistance and a high catalytic activity for the selective catalytic reduction. When such a composite oxide is used as the active component, a high $NO_x$-purifying ability can be achieved and reduction in the abilities of promoting selective catalytic reduction and adsorbing ammonia when subjected to high temperatures can be minimized.

A mass ratio of zirconia in this composite oxide, which is obtained assuming that the whole zirconium in this composite oxide is in the form of zirconia, is, for example, within a range of 20% to 70% by mass, and typically within a range of 40% to 70% by mass. A mass ratio of ceria in this composite oxide, which is obtained assuming that the whole cerium in this composite oxide is in the form of ceria, is, for example, within a range of 5% to 50% by mass, and typically within a range of 10% to 30% by mass.

In the case where the composite oxide contains tungsten, a mass ratio of tungsten (VI) oxide in the composite oxide, which is obtained assuming that the whole tungsten in this composite oxide is in the form of tungsten oxide (VI), is, for example, within a range of 5% to 20% by mass, and typically within a range of 8% to 15% by mass.

Silicon suppresses the poisoning of the active component caused by sulfur. In the case where the composite oxide contains silicon, a mass ratio of silica in the composite oxide, which is obtained assuming that the whole silicon in this composite oxide is in the form of silica, is, for example, within a range of 1% to 10% by mass.

Titanium suppresses the poisoning of the active component caused by sulfur and increases the heat resistance. In the case where the composite oxide contains titanium, a mass ratio of titania in the composite oxide, which is obtained assuming that the whole titanium in this composite oxide is in the form of titania, is, for example, within a range of 1% to 5% by mass.

Neodymium and yttrium increase the stability of zirconium and thus improve the durability of the active component. In the case where the composite oxide contains neodymium, a mass ratio of neodymium oxide in the composite oxide, which is obtained assuming that the whole neodymium in this composite oxide is in the form of neodymium oxide, is, for example, within a range of 1% to 5% by mass. In the case where the composite oxide contains yttrium, a mass ratio of yttria in the composite oxide, which is obtained assuming that the whole yttrium in this composite oxide is in the form of yttria, is, for example, within a range of 1% to 5% by mass.

Note that in the case where the composite oxide contains two or more of silica, titanium, neodymium and yttrium, a ratio of total amount of them to the amount of the composite oxide is, for example, within a range of 1% to 15% by mass.

The diesel particulate filter 32 can further contains alumina. Alumina is supported by the filter substrate 321, in particular, the honeycomb structure 321.

Alumina improves the heat resistance of the diesel particulate filter 32. A ratio of the amount of alumina to the total amount of the composite oxide and alumina is, for example, within a range of 5% to 30% by mass, and typically within a range of 10% to 20% by mass.

As shown in FIG. 1, the catalytic converter 40 includes a converter body 41 and an ammonia slip catalyst 42.

The converter body 41 is made of, for example, metal or alloy. The converter body 41 has a hollow structure provided with inlet and outlet ports. The inlet port of the converter body 41 is connected to the outlet port of the converter body 31 via the pipe 10c. The outlet port of the converter body 41 is connected to an end of a pipe 10d.

As shown in FIG. 5, the ammonia slip catalyst 42 is a monolith catalyst of straight flow type. The ammonia slip catalyst 42 is contained in the converter body 41 such that the exhaust gas supplied from the pipe 10c to the catalytic converter 40 passes through the through-holes of the ammonia slip catalyst 42 and then discharged into the pipe 10d.

The ammonia slip catalyst 42 is an oxidation catalyst and promotes oxidation of unreacted ammonia discharged from the diesel particulate filter 32. Although oxidation of ammonia produces nitrogen oxides, the amount of nitrogen oxides produced in the ammonia slip catalyst 42 is small because the amount of the unreacted ammonia discharged from the diesel particulate filter 32 is small, too. Thus, the ammonia slip catalyst 42 decreases the ammonia concentration of the exhaust gas without greatly increasing the nitrogen oxides concentration of the exhaust gas.

As shown in FIG. 6, the ammonia slip catalyst 42 includes a monolith honeycomb substrate 421 and a catalytic layer 422.

The monolith honeycomb substrate 421 is a column provided with through-holes each extending from one of the bases to the other of the bases. The monolith honeycomb substrate 421 is made of, for example, ceramics such as cordierite and silicon carbide. A metallic honeycomb substrate may be used as the substrate 421.

The catalytic layer 422 is formed on the partition walls of the monolith honeycomb substrate 421. The catalytic layer 422 may have a single-layer structure or a multi-layer structure.

The catalytic layer 422 includes, for example, a second precious metal element and a second carrier.

The second precious metal element is, for example, an element of platinum group such as platinum and palladium and typically contains platinum. The second precious metal element promotes oxidation of ammonia. The catalytic layer 422 may includes only a single precious metal element or a plurality of precious metal elements as the second precious metal element. For example, the catalytic layer 422 may contain only platinum or platinum and palladium as the second precious metal element. Note that use of palladium may degrade the ability of the ammonia slip catalyst 42 to oxidize ammonia. Thus, a proportion of palladium in the second precious metal element is, for example, 30% or 20% by mass or less, and typically 10% by mass or less.

A mass of the second precious metal element per 1 L of volumetric capacity of the ammonia slip catalyst 42 is, for example, within a range of 0.1 to 2.0 g/L, and typically within a range of 0.3 to 0.8 g/L. In the case where the zeolite to be described later sufficiently promotes oxidation of ammonia, the second precious metal element can be omitted.

The second carrier carries the second precious metal element. The second carrier is particles made of a refractory material such as alumina. The second carrier increases the surface area of the precious metal and dissipates the heat generated by the catalytic reaction so as to suppress sintering of the precious metal. The second carrier can be omitted.

The catalytic layer 422 further includes zeolite whose alkali metal ion such sodium ion and potassium ion is partially exchanged with a transition metal ion.

The zeolite is, for example, one or more of BEA, MFI, FER, MOR, CHA and ZSM5 zeolites. Typically, the zeolite is at least one of BEA and MFI zeolites or at least one of BEA, CHA and ZSM5 zeolites.

The transition metal ion is, for example, one or more of iron, copper, silver and platinum ions, and typically at least one of iron and copper ions. In the case of using CHA as the zeolite, used as the transition metal ion is, for example, at least one of copper and iron ions, and preferably copper ion. In the case of using BEA as the zeolite, used as the transition metal ion is, for example, at least one of copper and iron ions. In the case of using ZSM5 as the zeolite, used as the transition metal ion is, for example, at least one of copper and iron ions.

Such a zeolite has high abilities of adsorbing ammonia and promoting the reaction between nitrogen oxides and ammonia. Thus, even in the case where the ammonia concentration in the exhaust gas exceeds the purification capacity of the ammonia slip catalyst 42, the zeolite can adsorb excess ammonia. At least a part of ammonia adsorbed by the zeolite can be used for purifying nitrogen oxides.

Therefore, in the case of using the above-described zeolite in the catalytic layer 422, ammonia concentration of the exhaust gas discharged from the ammonia slip catalyst 42 can be decreased. Further, in this case, $NO_x$-purifying ability of the exhaust gas-purification system 1 is improved.

As described above, in the exhaust gas-purifying system 1, the diesel particulate filter 32 has a function of a common diesel particulate filter and a function of a selective catalytic reduction catalyst. Therefore, this exhaust gas-purifying system 1 can be installed in a relatively small space.

In the exhaust gas-purifying system 1, a zeolite having a high ability of adsorbing ammonia and a high ability of promoting the reaction between nitrogen oxides and ammonia is used in the catalytic layer 422. Although such a zeolite is generally low in heat resistance, the ammonia slip catalyst 42 is not subjected to high temperatures as compared with the diesel particulate filter 32. Therefore, the exhaust gas-purifying system 1 is less prone to cause performance degradation.

In the exhaust gas-purifying system 1, a ratio of the volumetric capacity of the diesel particulate filter 32 to the volumetric capacity of the ammonia slip catalyst 42 is, for example, within a range of 1 to 5. In the case where this ratio is small, it is difficult to sufficiently decrease $NO_x$ concentration of the exhaust gas. In the case where this ratio is large, it is difficult to sufficiently decrease ammonia concentration of the exhaust gas.

In the exhaust gas-purifying system 1, an amount of the active component per 1 L of the volumetric capacity of the diesel particulate filter 32 is, for example, within a range of 40 to 210 g/L, and typically within a range of 60 to 150 g/L. Alternatively, in the exhaust gas-purifying system 1, an amount of the active component per 1 L of the volumetric capacity of the diesel particulate filter 32 is, for example, within a range of 40 to 180 g/L, and typically, within a range of 60 to 100 g/L. In the case where an amount of the active component is small, a high $NO_x$-purifying performance cannot be achieved. In the case where an amount of the active component is large, the cost increases and the heat capacity of the diesel particulate filter 32 and the pressure loss of the exhaust gas increase. Consequently, the exhaust pressure of the system increases and the fuel efficiency is degraded.

An amount of zeolite per 1 L of volumetric capacity of the ammonia slip catalyst 42 is, for example, within a range of 10 to 300 g/L, and typically within a range of 120 to 210 g/L. In the case of using CHA as the zeolite, a mass of CHA per 1 L of volumetric capacity of the ammonia slip catalyst 42 is, for example, within a range of 60 to 200 g/L, and typically within a range of 80 to 140 g/L. In the case of using BEA as the zeolite, a mass of BEA per 1 L of volumetric capacity of the ammonia slip catalyst 42 is, for example, within a range of 80 to 200 g/L, and typically within a range of 100 to 160 g/L. In the case of using ZSM5 as the zeolite, a mass of ZSM-5 per 1 L of volumetric capacity of the ammonia slip catalyst 42 is, for example, within a range of 80 to 200 g/L, and typically within a range of 100 to 160 g/L. In the case where an amount of the zeolite is small, ammonia concentration of the exhaust gas cannot be decreased sufficiently. In the case where an amount of the zeolite is large, the cost and the heat capacity of the ammonia slip catalyst 42 increase. Consequently, when an amount of the zeolite exceeds a certain value, almost no improvement in the performance is achieved even when the amount of the zeolite is further increased.

A mass ratio of the zeolite in the diesel particulate filter 32 to the zeolite in the ammonia slip catalyst 42 is, for example, 2 or less, and typically zero. Decreasing this ratio results in improvement in the durability of the exhaust gas-purifying system 1.

Various modifications can be made on the exhaust gas-purifying system 1.

For example, FIG. 1 shows three catalytic converters 20, 30 and 40. A single catalytic converter may be used instead of the catalytic converters 30 and 40. That is, the diesel particulate filter 32 and the ammonia slip catalyst 42 may be arranged in a single converter body. In this case, the diesel particulate filter 32 and the ammonia slip catalyst 42 may be spaced apart from each other or may be integrated into one piece.

The catalytic layer 222 of the diesel oxidation catalyst 22 can contain an element of platinum group other than platinum and palladium instead of or in addition to platinum and palladium. The catalytic layer 222 may contain a transition metal element other than elements of platinum group instead of or in addition to elements of platinum group. For example, the catalytic layer 222 can contain one or more of platinum, palladium, rhodium, ruthenium, iridium and cobalt.

The filter substrate 321 of the diesel particulate filter 32, in particular, the honeycomb structure 3211 may further support a component other then the above-described active component. For example, the filter substrate 321, in particular, the honeycomb structure 3211 may further support one or more of platinum, palladium, rhodium, ruthenium, iridium and cobalt.

The catalytic layer 422 of the ammonia slip catalyst 42 can include an element of platinum group other than platinum and palladium instead of or in addition to platinum and palladium. The catalytic layer 422 may contain a transition metal element other than elements of platinum group instead of or in addition to elements of platinum group. For example, the catalytic layer 422 can contain one or more of platinum, palladium, rhodium, ruthenium, iridium and cobalt.

Examples of the present invention will be described below.
<Manufacture of Diesel Oxidation Catalyst DOC>

The diesel oxidation catalyst 22 described with reference to FIGS. 1 to 3 was manufactured by the following method.

First, 70 g of alumina powder, 100 g of zeolite powder, 200 g of alumina sol containing alumina at a concentration of 10% by mass, and 200 g of deionized water were mixed together to prepare slurry.

A monolith honeycomb substrate 221 having a volumetric capacity of 1.4 L was coated with the slurry. The coated film was dried at 250° C. for 1 hour, and was subjected to a heat treatment at 500° C. for 1 hour.

Then the substrate 221 was immersed in an aqueous solution containing platinum and then immersed in an aqueous solution containing palladium so as to load the coated layer on the substrate 221 with 2.8 g of platinum and 1.4 g of palladium.

Further, the structure was subjected to a heat treatment at 250° C. for 1 hour.

The diesel oxidation catalyst 22 described with reference to FIGS. 1 to 3 was thus completed. Hereinafter, the diesel oxidation catalyst thus obtained is referred to as "catalyst DOC".
<Manufacture of Diesel Particulate Filter DPF1>

The diesel particulate filter 32 described with reference to FIGS. 1 to 4 was manufactured by the following method.

First, 90 g of oxide powder containing zirconium, 200 g of alumina sol containing alumina in a concentration of 10% by mass, and 300 g of deionized water were mixed together to prepare slurry. As the oxide powder containing zirconium, used herein was oxide powder containing titanium, silicon, tungsten and cerium in addition to zirconium. In this oxide powder, a mass ratio of zirconium converted into that of zirconia was 51.0% by mass, a mass ratio of titanium converted into that of titania was 3% by mass, a mass ratio of silicon converted into that of silica was 2.3% by mass, a mass ratio of tungsten converted into that of tungsten (VI) oxide was 8.5% by mass, and a mass ratio of cerium converted into that of ceria was 16.3% by mass.

A filter substrate 321 having a volumetric capacity of 3.0 L and made of cordierite was coated with the slurry. The coated film was dried at 250° C. for 1 hour, and was subjected to a heat treatment at 500° C. for 1 hour.

The diesel particulate filter 32 described with reference to FIGS. 1 to 4 was thus completed. Hereinafter, the diesel particulate filter thus obtained is referred to as "filter DPF1".
<Manufacture of Diesel Particulate Filter DPF2>

The diesel particulate filter 32 described with reference to FIGS. 1 to 4 was manufactured by the same method as described for the filter DPF1 except that FeZSM5 powder was used instead of the oxide powder containing zirconium. Hereinafter, the diesel particulate filter thus obtained is referred to as "filter DPF2".
<Manufacture of Diesel Particulate Filter DPF3>

The diesel particulate filter 32 described with reference to FIGS. 1 to 4 was manufactured by the same method as described for the filter DPF1 except that CuCHA powder was used instead of the oxide powder containing zirconium. Hereinafter, the diesel particulate filter thus obtained is referred to as "filter DPF3".
<Manufacture of Diesel Particulate Filter DPF4>

The diesel particulate filter 32 described with reference to FIGS. 1 to 4 was manufactured by the following method.

First, 90 g of alumina powder, 200 g of alumina sol containing alumina in a concentration of 10% by mass, and 300 g of deionized water were mixed together to prepare slurry.

A filter substrate 321 having a volumetric capacity of 3.0 L and made of cordierite was coated with the slurry. The coated film was dried at 250° C. for 1 hour, and was subjected to a heat treatment at 500° C. for 1 hour.

The filter substrate 321 was immersed in an aqueous solution containing platinum, and subsequently immersed in an aqueous solution containing palladium so as to load the coated layer on the filter substrate 321 with 1.8 g of platinum and 0.9 g of palladium.

The diesel particulate filter 32 described with reference to FIGS. 1 to 4 was thus completed. Hereinafter, the diesel particulate filter thus obtained is referred to as "filter DPF4".
<Manufacture of Selective Catalytic Reduction Catalyst SCR>

A selective catalytic reduction catalyst was manufactured by the following method.

First, 160 g of zeolite, 200 g of alumina sol containing alumina in a concentration of 10% by mass, and 250 g of deionized water were mixed together to prepare slurry. The zeolite used herein was FeZSM5.

A monolith honeycomb substrate having a volumetric capacity of 3.0 L was coated with the slurry. The coated film was dried at 250° C. for 1 hour, and then subjected to a heat treatment at 500° C. for 1 hour.

A selective catalytic reduction catalyst was thus completed. Hereinafter, the selective catalytic reduction catalyst thus obtained is referred to as "catalyst SCR".
<Manufacture of Ammonia Slip Catalyst ASC1>

The ammonia slip catalyst 42 described with reference to FIGS. 1, 5 and 6 was manufactured by the following method.

First, 150 g of zeolite, 30 g of alumina powder, 200 g of alumina sol containing alumina in a concentration of 10% by mass, and 250 g of deionized water mixed together to prepare slurry. The zeolite used herein was FeZSM5.

A monolith honeycomb substrate 421 having a volumetric capacity of 1.0 L was coated with the slurry. The coated film was dried at 250° C. for 1 hour, and then subjected to a heat treatment at 500° C. for 1 hour.

The substrate 421 was immersed in an aqueous solution containing platinum and then immersed in an aqueous solution containing palladium so as to load the coated layer on the substrate 421 with 0.6 g of platinum and 0.3 g of palladium.

Further, the structure was subjected to a heat treatment at 250° C. for 1 hour.

The ammonia slip catalyst 42 described with reference to FIGS. 1, 5 and 6 was thus completed. Hereinafter, the ammonia slip catalyst thus obtained is referred to as "catalyst ASC1".

<Manufacture of Ammonia Slip Catalyst ASC2>

180 g of alumina powder, 200 g of alumina sol containing alumina in a concentration of 10% by mass, and 250 g of deionized water were mixed together to prepare slurry. An ammonia slip catalyst was manufactured by the same method as that described for the catalyst ASC1 except that the coated layer was formed using this slurry. Hereinafter, the ammonia slip catalyst thus obtained is referred to as "catalyst ASC2".

<Manufacture of Ammonia Slip Catalyst ASC3>

The ammonia slip catalyst 42 described with reference to FIGS. 1, 5 and 6 was manufactured by the following method.

First, 150 g of zeolite, 30 g of alumina powder, 200 g of alumina sol containing aluminum in a concentration of 10% by mass, and 250 g of deionized water were mixed together to prepare slurry. The zeolite used herein was a mixture of 70 g of CuCHA, 40 g of FeBEA, and 40 g of FeZSM5.

A monolith honeycomb substrate 421 having a volumetric capacity of 1.0 L was coated with the slurry. The coated film was dried at 250° C. for 1 hour, and then subjected to a heat treatment at 500° C. for 1 hour.

The substrate 421 was immersed in an aqueous solution containing platinum so as to load the coated layer on the substrate 421 with 0.5 g of platinum.

Further, the structure was subjected to a heat treatment at 250° C. for 1 hour.

The ammonia slip catalyst 42 described with reference to FIGS. 1, 5 and 6 was thus completed. Hereinafter, the ammonia slip catalyst thus obtained is referred to as "catalyst ASC3".

<Assembly of Exhaust Gas-Purifying System PS1>

The exhaust gas-purifying system 1 shown in FIG. 1 was assembled. Specifically, the catalyst DOC was used as the diesel oxidation catalyst 21. As the diesel particulate filter 32, the filter DPF1 was used. As the ammonia slip catalyst 42, the catalyst ASC1 was used.

Hereinafter, the exhaust gas-purifying system thus obtained is referred to as "purifying system PS1".

<Assembly of Exhaust Gas-Purifying System PS2>

The same exhaust gas-purifying system as the purifying system PS1 was manufactured except that the catalyst ASC2 was used instead of the catalyst ASC1. Hereinafter, the exhaust gas-purifying system thus obtained is referred to as "purifying system PS2".

<Assembly of Exhaust Gas-Purifying System PS3>

The same exhaust gas-purifying system as the purifying system PS1 was manufactured except that the filter DPF2 was used instead of the filter DPF1. Hereinafter, the exhaust gas-purifying system thus obtained is referred to as "purifying system PS3".

<Assembly of Exhaust Gas-Purifying System PS4>

The same exhaust gas-purifying system as the purifying system PS1 was manufactured except that the catalyst ASC2 was used instead of the catalyst ASC1. Hereinafter, the exhaust gas-purifying system thus obtained is referred to as "purifying system PS4".

<Assembly of Exhaust Gas-Purifying System PS5>

The same exhaust gas-purifying system as the purifying system PS1 was manufactured except that the filter DPF3 was used instead of the filter DPF1. Hereinafter, the exhaust gas-purifying system thus obtained is referred to as "purifying system PS5".

<Assembly of Exhaust Gas-Purifying System PS6>

Figure 9:
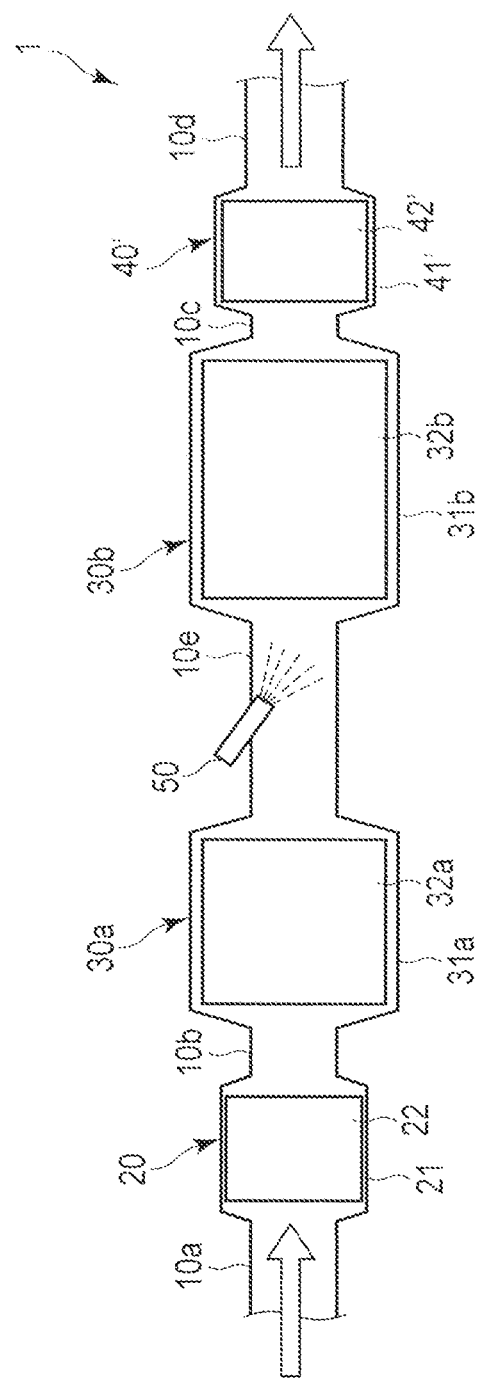
FIG. 9 is a view schematically showing an exhaust gas-purifying system according to a comparative example.

FIG. 9 is a view schematically showing an exhaust gas-purifying system according to a comparative example.

The exhaust gas-purifying system 1 shown in FIG. 9 is an exhaust gas-purifying system for purifying exhaust gas discharged from a diesel engine (not shown). The exhaust gas-purifying system 1 includes catalytic converters 20, 30a, 30b and 40' connected in series between the diesel engine and the tail pipe.

The catalytic converter 30a includes a converter body 31a and a diesel particulate filter 32a.

The converter body 31a is made of, for example, metal or alloy. The converter body 31a has a hollow structure provided with inlet and outlet ports. The inlet port of the converter body 31a is connected to the outlet port of the converter body 21 via the pipe 10b. The outlet port of the converter body 31a is connected to an end of a pipe 10e. Note that an injector 50 for injecting ammonia or a precursor thereof into the exhaust gas is provided not to the pipe 10b but to the pipe 10e.

The diesel particulate filter 32a is a monolith catalyst of wall flow type. The diesel particulate filter 32a is contained in the converter body 31a such that the exhaust gas supplied from the pipe 10b to the catalytic converter 30a passes through the partition walls of the diesel particulate filter 32a and then discharged into the pipe 10e. The diesel particulate filter 32a includes the same filter substrate as that described with reference to FIG. 4. The diesel particulate filter 32a removes particulate matter from the exhaust gas.

The catalytic converter 30b includes a converter body 31b and a selective catalytic reduction catalyst 32b.

The converter body 31b is made of, for example, metal or alloy. The converter body 31b has a hollow structure provided with inlet and outlet ports. The inlet port of the converter body 31b is connected to the outlet port of the converter body 31a via the pipe 10e. The outlet port of the converter body 31b is connected to an end of a pipe 10c.

The selective catalytic reduction catalyst 32b is a monolith catalyst of straight flow type. The selective catalytic reduction catalyst 32b is contained in the converter body 31b such that the exhaust gas supplied from the pipe 10e to the catalytic converter 30b passes through the through-holes of the selective catalytic reduction catalyst 32b and then discharged into the pipe 10c. The selective catalytic reduction catalyst 32b includes a monolith honeycomb substrate and a catalytic layer formed on the partition walls thereof. The selective catalytic reduction catalyst 32b promotes the reaction between nitrogen oxides and ammonia.

The catalytic converter 40 includes a converter body 41' and an ammonia slip catalyst 42'.

The converter body 41' is made of, for example, metal or alloy. The converter body 41' has a hollow structure provided with inlet and outlet ports. The inlet port of the converter body 41' is connected to the outlet port of the converter body 31b via the pipe 10c. The outlet port of the converter body 41' is connected to an end of a pipe 10d.

The ammonia slip catalyst 42' is a monolith catalyst of straight flow type. The ammonia slip catalyst 42' is contained in the converter body 41' such that the exhaust gas supplied from the pipe 10c to the catalytic converter 40' passes through the through-holes of the ammonia slip catalyst 42' and then discharged into the pipe 10d. The ammonia slip catalyst 42' includes a monolith honeycomb substrate and a catalytic layer formed on the partition walls thereof. The ammonia slip catalyst 42' promotes oxidation of unreacted ammonia discharged from the selective catalytic reduction catalyst 32b.

This exhaust gas-purifying system 1 was assembled. Specifically, the catalyst DOC was used as the diesel oxidation catalyst 21. As the diesel particulate filter 32a, the filter DPF4 was used. As the selective catalytic reduction catalyst 32b, the catalyst SCR was used. As the ammonia slip catalyst 42, the catalyst ASC2 was used.

Hereinafter, the exhaust gas-purifying system thus obtained is referred to as "purifying system PS6".

<Assembly of Exhaust Gas-Purifying System PS7>

The same exhaust gas-purifying system as the purifying system PS1 was assembled except that the catalyst ASC3 was used instead of the catalyst ASC1. Hereinafter, the exhaust gas-purifying system thus obtained is referred to as "purifying system PS7".

<Tests>

Initial and post-endurance performance was evaluated for each of the purifying system PS1 to PS7. Specifically, each of the purifying system PS1 to PS7 was mounted on an exhaust system for an engine with a piston displacement of 2.2 L, and the engine was driven under normal operating conditions. Under the operating conditions, the engine RPM was set at 2000 rpm and the torque was set at 170 Nm so as to keep the $NO_x$ concentration of the exhaust gas supplied to the purifying system at 250 ppm. The injection of aqueous urea using the injector 50 was performed such that the injection amount of urea is 0.75 times the amount of $NO_x$ (converted into an amount of urea) contained in the exhaust gas supplied to the purifying system. Further, gas-analyzing apparatus were arranged upstream and downstream of each purifying system to measure the $NO_x$ concentration of the exhaust gas.

FIG. 7 is a graph showing an example of performance of exhaust gas-purifying systems regarding ammonia slip and $NO_x$-purification. FIG. 8 is a graph showing an example of initial and post-endurance performance of exhaust gas-purifying systems regarding $NO_x$-purification. In FIG. 7, the abscissa represents the ammonia concentration of the exhaust gas discharged from the exhaust gas-purifying system.

As shown in FIG. 7, although the purifying system PS1 is slightly inferior to the purifying system PS6 in an ability to purify ammonia, the former has a higher ability to purify $NO_x$ than the latter. Although the purifying system PS2 has a slightly higher ability to purify $NO_x$ than the purifying system PS6, the ability of the former to purify ammonia is greatly lower than that of latter. Although the purifying system PS3 is slightly inferior to the purifying system PS6 in an ability to purify $NO_x$, the former has a higher ability to purify ammonia than the latter. The purifying system PS4 has a lower ability to purify ammonia and a much lower ability to purify ammonia than the purifying system PS6. The purifying system PS5 has a higher ability to purify ammonia and a higher ability to purify ammonia than the purifying system PS6. Although the purifying system PS7 has a slightly lower ability to purify ammonia than the purifying system PS6, the ability of the former to purify $NO_x$ is higher than that of latter.

As will be apparent from the above, the purifying systems PS1, PS3, PS5 and PS7 can replace the purifying system PS6. In addition, the purifying systems PS1, PS5 and PS7 achieved almost the same or more than the ability of the purifying system PS6 to purify ammonia and further achieved a higher ability to purify $NO_x$ than the purifying system PS6, that is, the purifying systems PS1, PS5 and PS7 offered excellent performance.

As shown in FIG. 8, the performance degradation is suppressed in the purifying system PS1 as compared with the purifying system PS4. Considering the data in FIGS. 7 and 8, it is considered that decreasing the amount of zeolite in the diesel particulate filter improves the durability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An exhaust gas-purifying system for purifying exhaust gas discharged from a diesel engine, comprising:
   a diesel oxidation catalyst through which the exhaust gas passes;
   a diesel particulate filter which includes a filter substrate and an active component supported by the filter substrate and exhibiting a catalytic activity for selective catalytic reduction and through which the exhaust gas having passed through the diesel oxidation catalyst penetrates; and
   an ammonia slip catalyst which includes a zeolite whose alkaline metal ions are partially exchanged with transition metal ions and through which the exhaust gas having penetrated the diesel particulate filter passes.

2. The exhaust gas-purifying system according to claim 1, wherein the active component is a composite oxide containing zirconium.

3. The exhaust gas-purifying system according to claim 2, wherein the ammonia slip catalyst further includes a platinum group element.

4. The exhaust gas-purifying system according to claim 3, further comprising an injector which injects ammonia or a precursor thereof into the exhaust gas between the diesel oxidation catalyst and the diesel particulate filter.

5. The exhaust gas-purifying system according to claim 2, further comprising an injector which injects ammonia or a precursor thereof into the exhaust gas between the diesel oxidation catalyst and the diesel particulate filter.

6. The exhaust gas-purifying system according to claim 2, wherein the composite oxide further contains at least one element selected from the group consisting of aluminum, silicon, titanium, cerium and tungsten.

7. The exhaust gas-purifying system according to claim 6, wherein the ammonia slip catalyst further includes a platinum group element.

8. The exhaust gas-purifying system according to claim 7, further comprising an injector which injects ammonia or a precursor thereof into the exhaust gas between the diesel oxidation catalyst and the diesel particulate filter.

9. The exhaust gas-purifying system according to claim 7, further comprising an injector which injects ammonia or a precursor thereof into the exhaust gas between the diesel oxidation catalyst and the diesel particulate filter.

10. The exhaust gas-purifying system according to claim 1, wherein the ammonia slip catalyst further includes a platinum group element.

11. The exhaust gas-purifying system according to claim 10, further comprising an injector which injects ammonia or a precursor thereof into the exhaust gas between the diesel oxidation catalyst and the diesel particulate filter.

12. The exhaust gas-purifying system according to claim 1, further comprising an injector which injects ammonia or a precursor thereof into the exhaust gas between the diesel oxidation catalyst and the diesel particulate filter.

* * * * *